United States Patent
Sri et al.

(10) Patent No.: US 9,679,492 B2
(45) Date of Patent: Jun. 13, 2017

(54) CALCULATING EFFECTIVE GPA OF STUDENTS IN EDUCATION PLATFORMS

(71) Applicant: Chegg, Inc., Santa Clara, CA (US)

(72) Inventors: Paul Chris Sri, San Jose, CA (US); Vincent Le Chevalier, San Jose, CA (US); Benjamin James Bercovitz, Mountain View, CA (US); Anand Madhavan, Santa Clara, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 132 days.

(21) Appl. No.: 14/051,061

(22) Filed: Oct. 10, 2013

(65) Prior Publication Data

US 2015/0106377 A1   Apr. 16, 2015

(51) Int. Cl.
*G06F 17/30* (2006.01)
*G09B 7/00* (2006.01)

(52) U.S. Cl.
CPC ..................................... *G09B 7/00* (2013.01)

(58) Field of Classification Search
CPC ......... G06F 17/30707; G06F 17/30559; G06F 17/3061
USPC ..................... 707/748, 740; 705/26; 434/362
See application file for complete search history.

(56) References Cited

U.S. PATENT DOCUMENTS

| | | | |
|---|---|---|---|
| 7,827,125 B1* | 11/2010 | Rennison | G06F 17/3066 706/14 |
| 9,292,550 B2* | 3/2016 | Yarmus | |
| 2004/0078225 A1* | 4/2004 | Schramm-Apple | G06F 19/324 705/2 |
| 2004/0230495 A1* | 11/2004 | Lotvin et al. | 705/26 |
| 2008/0270166 A1* | 10/2008 | Morin | G06Q 10/06 705/326 |
| 2010/0009332 A1* | 1/2010 | Yaskin | G09B 7/00 434/362 |
| 2011/0010306 A1* | 1/2011 | Gonzalez | G06Q 10/10 705/326 |
| 2014/0188897 A1* | 7/2014 | Baker et al. | 707/748 |
| 2014/0205990 A1* | 7/2014 | Wellman | G09B 7/00 434/362 |

* cited by examiner

*Primary Examiner* — Jeffrey A Burke
*Assistant Examiner* — Thong Vu
(74) *Attorney, Agent, or Firm* — Fenwick & West LLP

(57) ABSTRACT

An online educational publishing platform generates an effective grade point average for respective users of the platform by aggregating data describing educational activities of the users. The educational activity data includes users' interactions with pages of content distributed by the online educational platform, as well as data retrieved from user profiles of the users and external databases. The educational activity data is filtered into a plurality of categories and scored based on scoring metrics associated with the categories. Using the scored user activity data, the publishing platform generates the effective grade point averages. Each user may have multiple eGPAs whose value depends on how the eGPA was generated. Accordingly, an eGPA provides a quantitative representation of a student's academic engagement, achievements, and experiences.

20 Claims, 7 Drawing Sheets

| Academic | | | | |
|---|---|---|---|---|
| Score 502 | Subcategory 504 | Scoring Metric 506 | Weight 508 | Source |
| A1 | Courses | Number of Courses, Credits | $W_{A_1}$ | Internal |
| A2 | Course Difficulty | Course Difficulty Rating | $W_{A_2}$ | Internal |
| A3 | School | School Ranking | $W_{A_3}$ | External |
| A4 | Transcript | Academic GPA | $W_{A_4}$ | Internal |
| A5 | Connections | Professors, Students | $W_{A_5}$ | Internal / External |
| A6 | Publications | Papers, References | $W_{A_6}$ | Internal |
| A7 | Awards | Awards, Commendations | $W_{A_7}$ | Internal |
| A8 | Speaking | Engagements, Conferences | $W_{A_8}$ | Internal |
| A9 | Other | Data | $W_{A_9}$ | -- |

FIG. 5A

| Engagement | | | | |
|---|---|---|---|---|
| Score 502 | Subcategory 504 | Scoring Metric 506 | Weight 508 | Source |
| E1 | Points | Leaderboard | $W_{E_1}$ | Internal |
| E2 | Badges | Milestones | $W_{E_2}$ | Internal |
| E3 | Connections | Educational Platform Network | $W_{E_3}$ | Internal |
| E4 | Conferences | Interest, Attendance | $W_{E_4}$ | Internal / External |
| E5 | Clubs | Professional, Academic | $W_{E_5}$ | Internal / External |
| E6 | Other | Data | $W_{E_6}$ | -- |

FIG. 5B

| Professional | | | | |
|---|---|---|---|---|
| Score 502 | Subcategory 504 | Scoring Metric 506 | Weight 508 | Source |
| Pr1 | Experience | Internships, Jobs | $W_{Pr_1}$ | Internal / External |
| Pr2 | Connections | Coworkers, Companies | $W_{Pr_2}$ | External |
| Pr3 | Reviews | Testimonials, Ratings | $W_{Pr_3}$ | External |
| Pr4 | Publications | Papers, References | $W_{Pr_4}$ | Internal / External |
| Pr5 | Awards | Awards, Commendations | $W_{Pr_5}$ | Internal / External |
| Pr6 | Speaking | Engagement, Conferences | $W_{Pr_6}$ | Internal / External |
| Pr7 | Other | Data | $W_{Pr_7}$ | -- |

FIG. 5C

| Market | | | | |
|---|---|---|---|---|
| Score 502 | Subcategory 504 | Scoring Metric 506 | Weight 508 | Source |
| M1 | Degrees Demand | College Major | $W_{M_1}$ | External |
| M2 | Skill Demand | Skills, Learning Units | $W_{M_2}$ | Internal / External |
| M3 | Job Demand | Industry Demand | $W_{M_3}$ | External |
| M4 | Other | Data | $W_{M_4}$ | -- |

FIG. 5D

| Personal | | | | |
|---|---|---|---|---|
| Score 502 | Subcategory 504 | Scoring Metric 506 | Weight 508 | Source |
| Pe1 | Connections | Facebook, Twitter, G+ | $W_{Pe_1}$ | External |
| Pe2 | EQ | Emotional Intelligence | $W_{Pe_2}$ | Internal |
| Pe3 | OSS | Github, Sourceforge | $W_{Pe_3}$ | External |
| Pe4 | Publications | Wikipedia, Video, Content | $W_{Pe_4}$ | External |
| Pe5 | Other | Data | $W_{Pe_5}$ | -- |

FIG. 5E

CALCULATING EFFECTIVE GPA OF STUDENTS IN EDUCATION PLATFORMS

BACKGROUND

Field of the Invention

This invention relates to generating effective grade point averages for users of online educational platforms.

Description of the Related Art

In traditional classroom-based education environments, students are graded to measure the students' levels of achievement in their coursework. In many countries, a student's grades from current and previous classes are averaged to create a grade point average (GPA), which serves as an indicator of the student's academic abilities and work ethic. Despite its prevalence, a GPA only quantifies a narrow set of academic skills and often proves to be little more than loosely correlated to students' success beyond school. Accordingly, employers seeking to assess and compare job applicants often evaluate the applicants based on additional information not measured by an academic GPA. However, this information is often intangible and poorly defined, and as such it is difficult to quantitatively compare job applicants based on information not captured by an academic GPA.

SUMMARY

An online educational publishing platform generates an effective grade point average (eGPA) for respective users of the platform. An eGPA quantifies a student's academic engagement and achievements based on scored, aggregated educational activities completed by the student. To generate an eGPA, the publishing platform aggregates educational activity data of users by analyzing the users' activities on the platform, accessing the data from user profiles of the users, and retrieving the data from external databases. The publishing platform filters the data into a plurality of categories of user activity data. Each category is associated with a scoring metric defining a mapping between activities completed by a user and a score assigned to the activity category. Based on the user activity data of a user that is filtered into each category and the scoring metric associated with the category, the publishing platform scores the user's educational activities. The publishing platform generates an eGPA for each user of the platform based on the scored activity data. In one embodiment, the eGPA represents a weighted sum of the scored activity data, normalized to a range analogous to academic GPAs.

Accordingly, an eGPA provides a quantitative representation of a student's academic engagement, achievements, and experiences. Based on their respective eGPAs, students using the publishing platform can be quantitatively evaluated and compared. For example, students applying for the same job or scholarship can compare their relative eGPAs to compare their overall qualifications or eligibility. Moreover, a student's eGPA may be recalculated based on a number of different factors. Each student therefore has multiple eGPAs that depend on the context in which the eGPA was calculated, rather than a single, relatively static academic grade point average.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIGS. 5A-E illustrate example categories of user activity data, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments described herein provide a method for generating an effective grade point average (eGPA) for users of an online educational publishing platform. An eGPA quantifies a student's academic engagement and achievements based on scored, aggregated educational activities completed by the student. Accordingly, the eGPA provides a more complete representation of a student's academic abilities and experiences than a traditional academic GPA.

Figure 1:
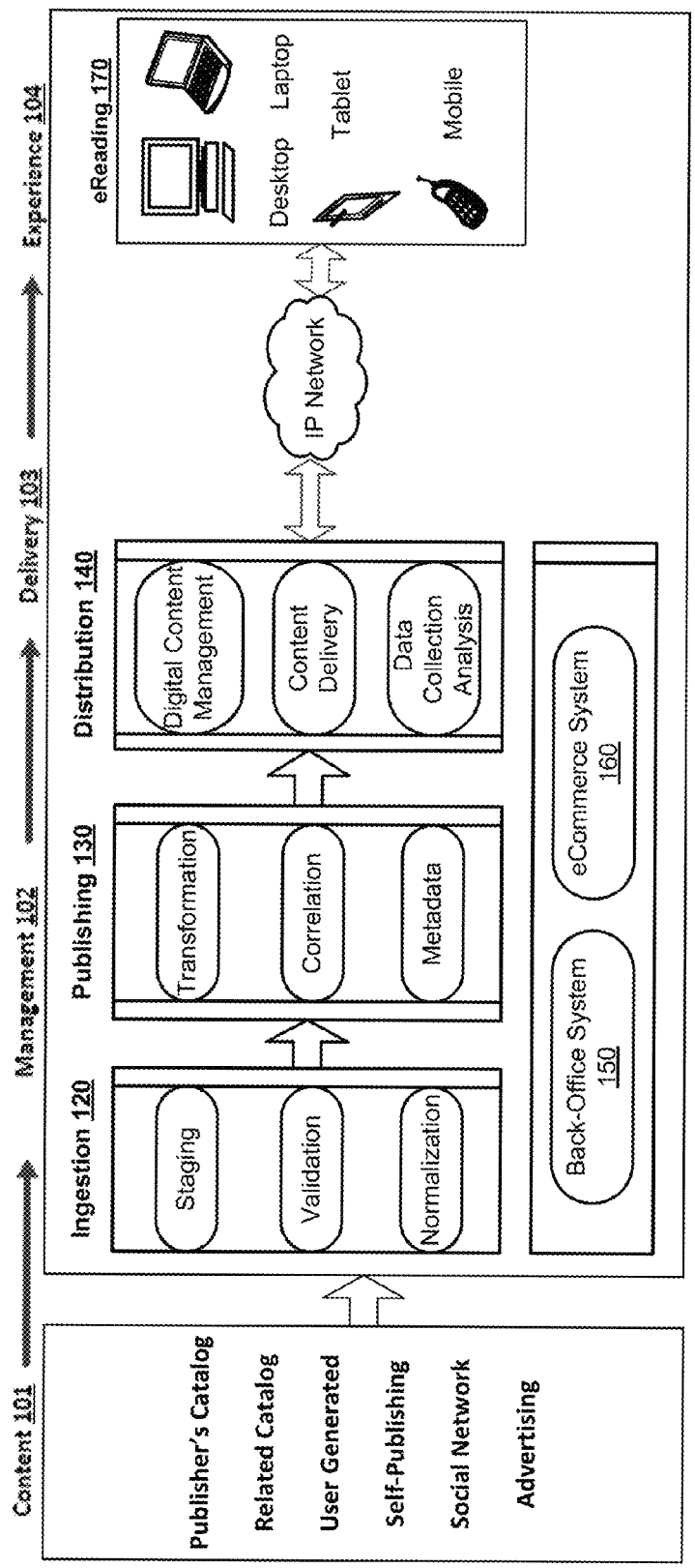
FIG. 1 illustrates an example publishing platform, according to one embodiment.

The method for generating an eGPA is organized around an online educational publishing platform. FIG. 1 is a high-level block diagram illustrating the platform environment, organized around four function blocks: content 101, management 102, delivery 103, and experience 104. Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a textbook or tradebook, a set of self-published notes, a testing document, or any other published document.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the reconstructed document, as well as locations of content within each heading. During reconstruction, document metadata describing a product description, pricing, and terms (e.g., whether the content is for sale, rent, or subscription, or whether it is accessible for a certain time period or geographic region, etc.) are also added to the reconstructed document.

The reconstructed document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure.

The distribution system 140 packages content for delivery, uploads the content to content distribution networks, and makes the content available to end users based on the content's digital rights management policies. In one embodiment, the distribution system 140 generates unique access codes for each service, or portions of each service, for distribution to user devices when access to the service (or portion thereof) is authorized. The distribution system 140 may also generate time-sensitive URLs to content locations, obfuscating the link to prevent unauthorized access. In one embodiment, the distribution system 140 includes digital content management, content delivery, and data collection and analysis subsystems.

Whether the ingested document is in a markup language document or is reconstructed by the publishing system 130, the distribution system 140 may aggregate additional content layers from numerous sources into the ingested or reconstructed document. These layers, including related content, advertising content, social content, and user-generated content, may be added to the document to create a dynamic, multilayered document. For example, related content may comprise material supplementing the foundation document, such as study guides, testing materials, solutions manuals, glossaries, journal articles, and terms listings. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In one embodiment, user-generated content may be self-published by a user and made available to other users as a related content layer associated with a document or as a standalone document.

As layers are added to the reconstructed document, page information and metadata of the document are referenced by all layers to merge the multilayered document into a single reading experience. The publishing system 130 may also add information describing the supplemental layers to the reconstructed document's table of contents. Because the page-based document ingested into the management block 102 or the reconstructed document generated by the publishing system 130 is referenced by all associated content layers, the ingested or reconstructed electronic document is referred to herein as a "foundation document," while the "multilayered document" refers to a foundation document and the additional electronic content layers associated with the foundation document.

The back-office system 150 of management block 102 enables business processes such as human resources tasks, sales and marketing, customer and client interactions, and technical support. The eCommerce system 160 interfaces with back office system 150, publishing 130, and distribution 140 to integrate marketing, selling, servicing, and receiving payment for digital products and services.

Delivery block 103 of an educational digital publication and reading platform distributes content for user consumption by, for example, pushing content to edge servers on a content delivery network. Experience block 104 manages user interaction with the publishing platform through browser application 170 by updating content, reporting users' reading activities, and assessing network performance.

In the example illustrated in FIG. 1, the content distribution and protection system is interfaced directly between the distribution sub-system 140 and the browser application 170, essentially integrating the digital content management (DCM), content delivery network (CDN), delivery modules, and eReading data collection interface for capturing and serving all users' content requests. Content download may be authorized granularly, such as one page at a time. By having content served dynamically and mostly on-demand, the content distribution and protection system effectively authorizes the download of one page of content at a time through time-sensitive dedicated URLs which only stay valid for a limited time, for example a few minutes in one embodiment, all under control of the platform service provider.

HTML5 Educational Platform Environment

Figure 2:
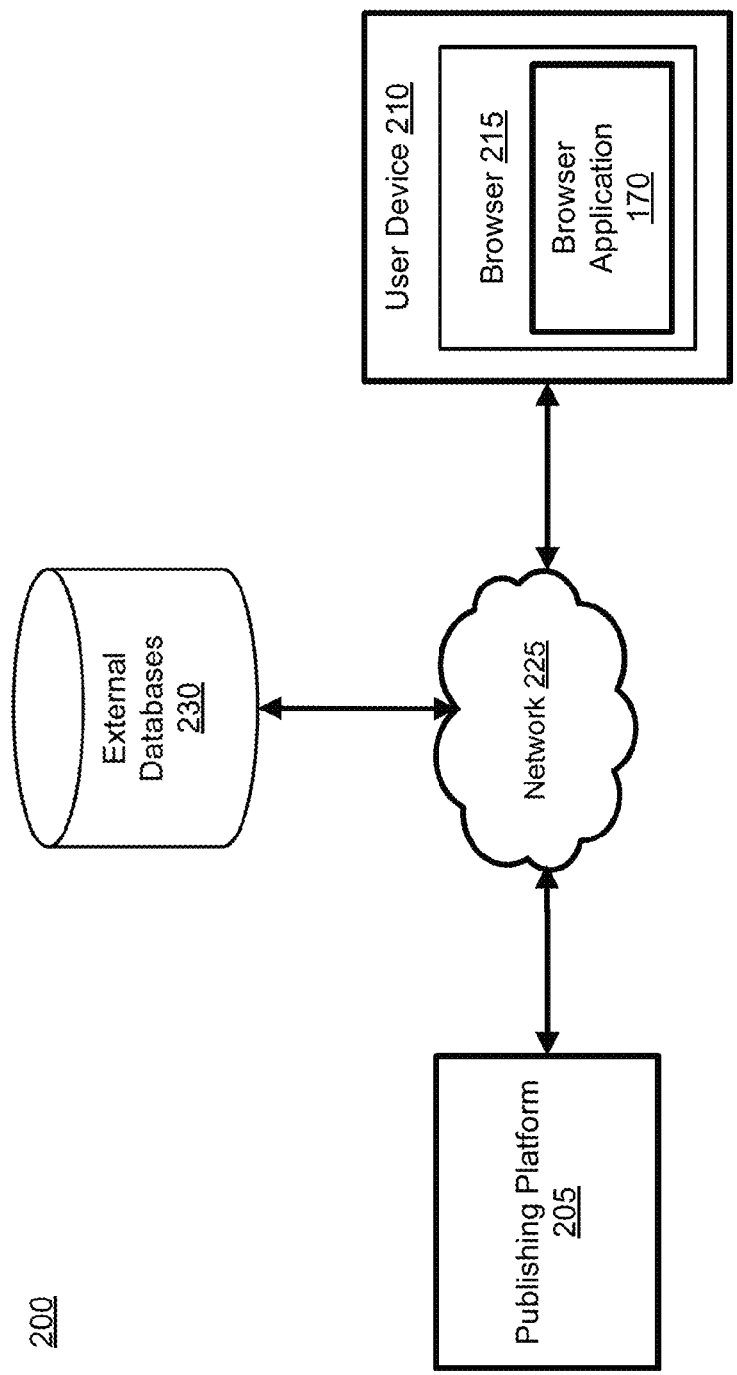
FIG. 2 illustrates an educational platform environment, according to one embodiment.

FIG. 2 illustrates an educational platform environment 200 including a publishing platform 205, a user device 210, and one or more external databases 230. The external databases 230 are databases maintained by one or more third parties that store information relating to educational activities of users of the publishing platform 205. For example, an external database 230 maintained by a ranking or evaluating organization stores records identifying current demand for degrees, skills, or jobs in a given region. An external database 230 maintained by a professional organization stores records of members of the organization, attendees and speakers at conferences hosted by the organization, and individuals who have received awards from the organization. An external database 230 maintained by an employer stores records of individuals who have worked for the employer as an intern or full-time employee. An external database 230 maintained by a journal publisher stores records of individuals whose papers have been published in the journal. An external database 230 maintained by a social networking system or professional networking system stores records of connections between users of the system and communications between the users.

One user device 210 is illustrated in FIG. 2, but any number of user devices 210 may communicate with platform 205 to access the content distributed by platform 205. Each device 210 executes a web browser 215 and at least one browser application 170. In one embodiment, each user is associated with an account on the publishing platform 205, and content purchased or requested by the user through the platform 205 is made available through the user account. In one embodiment, the user device 210 may also be registered to the account to authorize the device for accessing content. Alternatively, the publishing platform 205 may establish an authenticated web session on a device 210 when the user requests to access content of the platform 205 from the device 210. Furthermore, a user may access and interact with multilayered content synchronously on a plurality of devices 210. For example, a user may simultaneously use one or more devices 210, such as a desktop computer, a laptop, a smart phone, a tablet, an eReader, an Internet television, a set-top box, or any other device including computing functionality and data communication capabilities, to interact with content distributed by the publishing platform 205.

Contrary to other existing digital publishing services, the educational digital publication and reading platform of the present invention allows the user to access content without downloading a specific reading, note-taking, testing, or social networking application from publishers. Rather, the browser application 170, comprising client software compatible with the web browser 215, constructs document pages using structureless HTML5 elements. It should be noted that browser applications 170 comprise eReading applications as well as supplemental content applications that function in the browser environment to support the user's eReading activities and overall engagement with the electronic content distributed by the platform, such as notepad applications, social applications, testing applications, and advertising applications. In one embodiment, the browser application 170 integrates a number of a user's reading activities, including reading the content, navigating between pages, creating highlights, interacting with advertisements, generating social content, taking notes in relation to the content of the document, and taking tests associated with a document. For example, the browser application 170 may upload user-generated content, such as a user's answers to test questions, to the publishing platform 205. The uploaded user-generated content is stored and archived into the on-line end user account.

Aspects of the publishing platform 205 may function similarly to the systems 120, 120, and 140 described with reference to the management block 102 of FIG. 1. The publishing platform 205 delivers multilayered content to the browser application 170 executing on the user device 210 through the network 225. When a user is authorized to receive content from the publishing platform 205, the online configured browser application 170 may fetch content from the platform 205 in small increments, such as one page at a time. Alternatively or additionally, the user device 210 may cache one or more pages of the document to enable faster retrieval of the pages.

The publishing platform 205 analyzes user activity on the platform 205 and retrieved from the external databases 230 to generate effective grade point averages (eGPAs) for each user of the publishing platform 205. The publishing platform 205 filters the user activity data into categories and scores each category of activities based on the user activity data and scoring metrics for the category. Using the scores for each of the categories of activities, the publishing platform 204 generates an eGPA. Accordingly, an eGPA provides a mechanism for quantitatively comparing two or more users of the publishing platform 205 based on a number of the users' educational activities, including coursework, professional development, and social activities. A user's eGPA may be normalized against eGPAs of similar users, enabling a user to compare his overall engagement with that of his peers. Furthermore, a user's eGPA may be recalculated on a frequent basis, providing a substantially real-time representation of the user's activities. In one embodiment, the formula used by the publishing platform 205 for generating eGPAs is made transparent to the users of the platform 205 so that users can readily see the effect of the activities they do (or do not) complete on their resulting eGPA.

Communication between the publishing platform 205, user device 210, and external databases 230 is enabled by network 225. In one embodiment, the network 225 uses standard communications technologies and/or protocols. Thus, the network 225 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 225 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 225 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 225 can also include links to other networks such as the Internet.

Figure 3:
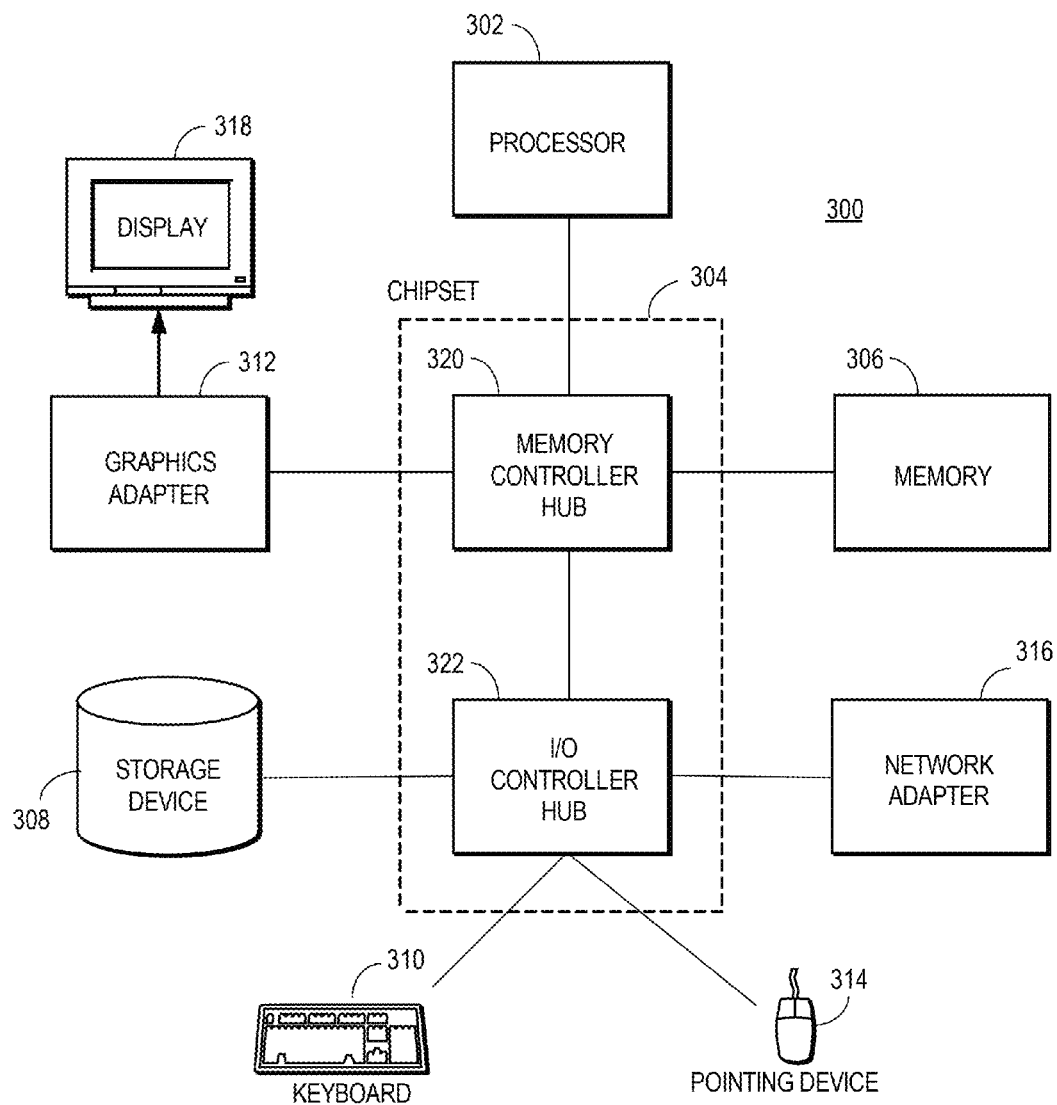
FIG. 3 is a high-level block diagram of a computer for use as a client device, according to one embodiment.

A high-level block diagram of a computer 300, as an example of a user device 210, is illustrated in FIG. 3. Illustrated are at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display device 318 is coupled to the graphics adapter 312. A storage device 308, keyboard 310, pointing device 314, and network adapter 316 are coupled to the I/O controller hub 322. Other embodiments of the computer 300 have different architectures. For example, the memory 306 is directly coupled to the processor 302 in some embodiments.

The storage device 308 is a non-transitory computer-readable storage medium such as a hard drive, compact disk read-only memory (CD-ROM), DVD, or a solid-state memory device. The memory 306 holds instructions and data used by the processor 302. The pointing device 314 is a mouse, track ball, or other type of pointing device, and is used in combination with the keyboard 310 to input data into the computer 300. The graphics adapter 312 displays images and other information on the display device 318. The network adapter 316 couples the computer 300 to a network. Some embodiments of the computer 300 have different and/or other components than those shown in FIG. 3. The types of computer 300 can vary depending upon the embodiment and the desired processing power. Other computing devices may alternatively be used as the user device 210, such as a tablet, a smart phone, an Internet television, or a gaming console.

Educational Publishing Platform

Figure 4:
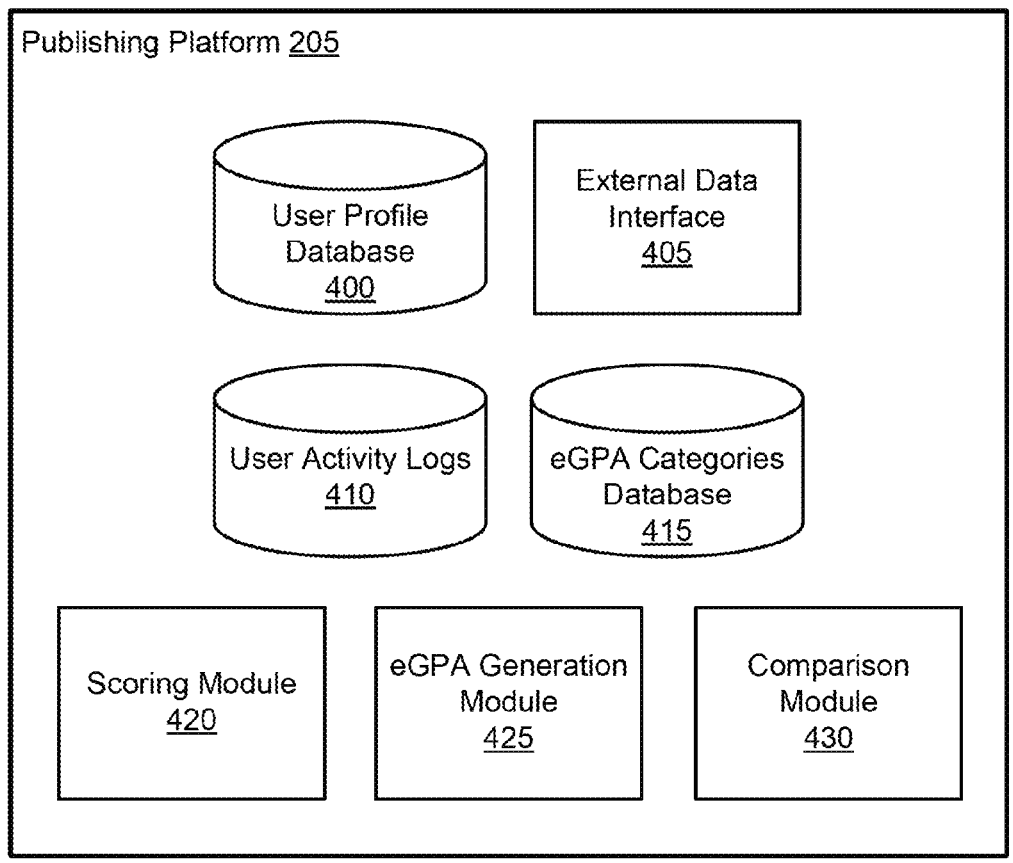
FIG. 4 is a block diagram illustrating modules within an educational publishing platform, according to one embodiment.

FIG. 4 is a block diagram illustrating modules within the publishing platform 205. In one embodiment, the publishing platform 205 includes a user profile store 400, user activity logs 405, an external data interface 410, an eGPA categories database 415, a scoring module 420, an eGPA generation module 425, and a comparison module 430. Other embodiments of the publishing platform 205 may include fewer or more modules, and distribute the functionalities among the modules in a different manner.

The user profile database 400 stores a user profile for each user of the publishing platform 205. A user's user profile stores personal data of the user, such as the user's location, a school at which the user is enrolled and the user's expected year of graduation from the school, the user's major or course of study, and a profession or industry in which the user works. A user profile may also store a list of courses the user has or is taking, as well as other users of the publishing platform 205 to whom the user is connected via a social networking system of the platform 205.

The user activity logs 405 store data describing educational activities of users on the publishing platform 205. The stored data includes data corresponding to the users' interactions with pages of content distributed by the publishing platform 205, such as a number of pages of content read by the user, type or frequency of user-generated content related to a foundation document created by the user, or the performance of a user on a test distributed by the publishing platform 205. Furthermore, the user activity logs 405 may store records of interactions between users of the publishing platform 205 via the platform 205, such as a user asking a coursework-related question of another user.

In one embodiment, the user activity logs 405 store user data aggregated according to educational courses. An educational course typically has a series of assigned or recommended activities for users to complete within a specified time period. During the time period associated with a course, users interact with the educational platform 205 to complete the assigned or recommended activities, and the educational platform 205 stores passive, active, and recall activities of the users in the user activity logs 405. Passive activities relate to users' passive interactions with published academic content associated with a course, such as reading a textbook prescribed for the course. For passive activities completed by a particular user, the user activity logs 405 stores data describing pages of the published content requested by the user and a time at which the user requested the pages of content. Active activities relate to user-generated content created by users of the educational platform 205. For example, active activities include creating notes and highlights associated with a published document, as well as connecting and communicating with other users of the publishing platform 205. For active activities completed by a particular user, the educational platform 205 stores data describing the content generated by the user and a time at which the user generated the content. Recall activities test users' knowledge acquired from previous passive and active activities. Recall activities integrate user-generated content with pre-existing documents. For example, recall activities include completing assignments and taking tests generated by an instructor of an educational course. User-generated content created during a recall activity (e.g., a user's answers to questions of a test) may be scored against an answer key for the activity. For recall activities completed by a user, the user activity logs 405 stores an identifier of the activity completed by the user, a time at which the user completed the activity, and the user's score on the activity if the user's user-generated content is scored against an answer key.

The external data interface 410 retrieves data describing educational activities of users from the external databases 230. In one embodiment, the external data interface 410 accesses external data via application programming interfaces (APIs) provided by the operators of the external databases 230. In one embodiment, the external data interface 410 accesses external database 230 based on user authorization. For example, the external data interface 410 accesses a user's social network connections from a social graph database stored by a social networking system when the user provides the user's login credentials for the social networking system and authorizes the publishing platform 205 to access the user's social networking information.

The eGPA categories database 415 stores, for each of a plurality of categories of user activity data, a scoring metric and a relative weight for the category. A scoring metric defines a mapping between activities completed by a user and a score assigned to the activity category. A weight defines a relative importance of the category for a user's overall eGPA. The weights for the categories of user activity data may be predefined, or may be adjusted to accommodate desired user characteristics. For example, an employer may specify weights for the categories when comparing job applicants, specifying a relative importance of the categories for comparing the applicants' qualifications.

The weight of each of the categories of user activity data may depend on user profile data of the user. For example, the publications and conferences categories may be weighted based on the user's profession or industry. If the user is in a profession that highly values publications and conference attendance (e.g., academic research), the publications and conferences categories may be assigned a relatively large weight. On the other hand, if a user is in a profession that does not require publications or conference attendance (e.g., construction work), the publications and conferences categories may be assigned a relatively small weight.

FIGS. 5A-E illustrate example data categories stored in the eGPA categories database 410. As illustrated in the figures, user activities are filtered into one of five categories (academic, engagement, professional, market, and personal), each with respective subcategories. However, in other embodiments, user activity data may be filtered into fewer or more categories and subcategories than those shown in FIGS. 5A-E.

As illustrated in FIGS. 5A-E, each subcategory 504 of user activity data is associated with a scoring metric 506 indicating how user activity data within the subcategory is to be scored. Based on the scoring metric 506 and the activities completed by a user that fall within the subcategory 504, each subcategory of data is assigned a score 502. Each subcategory 504 of user activity data is also associated with a weight 508, indicating a relative importance of the subcategory for a user's eGPA.

Returning to FIG. 4, the scoring module 420 of the publishing platform 205 retrieves user activity data from the user profile database 400 and user activity logs 405, receives external user activity data from the external data interface 410, and filters the user activity data into the categories and subcategories defined in the eGPA categories database 415. Based on the scoring metrics for the subcategories, as illustrated, for example, in FIGS. 5A-E, the scoring module 420 scores the user activity data. For example, some subcategories may be scored based on the number of activities a user has completed that fall within a category, such as a number of courses the user has taken, a number of conferences attended by the user, a number of professional or social connections of the user, a number of clubs of which the user is a member, or a number of publications authored by the user. Other subcategories may be scored relative to a baseline. A baseline may be a fixed value specified by, for example, an instructor of a course, an employer seeking job applicants, an operator of the platform 205, or a baseline may be an average number of activities completed by users of the platform 205. For example, the number of pages a user reads of a document may be scored based on whether a user read more than or less than a number of pages assigned by an instructor. Alternatively, the number of pages a user reads of a document may be scored based on whether the user has read more or fewer pages than an average number of pages read by other students in the user's educational courses. For other subcategories, the data ingested by the publishing platform 205 is already a quantitative representation of a user's activities, such as an academic grade point average computed by a school, a user's emotional intelligence (EQ) score, a school ranking, or demand for degrees, skills, or jobs.

In one embodiment, the scoring module 420 scores user activities based on user profile data of the user. For example, the scoring module 420 may score the courses a user has taken based on whether the courses are related to a user's major, where courses related the user's major receive a higher score than courses that are not related to the user's major. As another example, a user's acquired skills may be scored based on the applicability of the skills to a user's profession, where skills that are used in the user's profession receive a higher score than skills not used in the user's profession. In a further example, the scoring module 420 may give a higher score to a user's publications if the user is in high school than if the user is in graduate school.

In one embodiment, the score assigned to an activity completed by a user depends on an amount of time elapsed since the user completed the activity. The scoring module 420 may apply a time decay factor to the scored user activity data, decaying the score based the amount of time since the user completed the activity. The scoring module 420 may apply a different time decay factor to each subcategory of data. For example, the score for a user asking a question through the educational platform 205 may be decayed rapidly after the user asks the question. On the other hand, the score for a user completing an internship or a course may be decayed at a significantly lower rate.

The eGPA generation module 425 generates an eGPA for users of the educational platform 205 based on the scores calculated by the scoring module 420. In one embodiment, the eGPA generation module 425 generates an eGPA by a weighted sum of the scored user activity data. For example, given academic category scores $A_i$, engagement category scores $E_j$, professional category scores $Pr_k$, market category scores $M_l$, and personal category scores $Pe_m$, each with a respective weight W, the eGPA generation module 425 generates an eGPA by the equation:

$$eGPA = \sum_{i=1}^{N_1} A_i \times W_{A_i} + \sum_{j=1}^{N_2} E_j \times W_{E_j} + \sum_{k=1}^{N_3} Pr_k \times W_{Pr_k} + \sum_{l=1}^{N_4} M_l \times W_{M_l} + \sum_{m=1}^{N_5} Pe_m \times W_{Pe_m} \quad (1)$$

Alternatively, the eGPA generation module 425 may weight the categories of data differently. For example, the eGPA generation module 425 may generate an eGPA by the equation:

$$eGPA = \sum_{i=1}^{N_1} 3(A_i \times W_{A_i}) + \sum_{k=1}^{N_3} Pr_k \times 5 e^{W_{Pr_k}} + \sum_{l=1}^{N_4} M_l \times \frac{\sqrt{W_{M_l}}}{100} + \ldots \quad (2)$$

In one embodiment, because students, teachers, and employers are accustomed to comparing students based on their academic GPAs, the eGPA generation module 425 normalizes the calculated eGPAs to a numerical range analogous to academic GPAs (such as the range 0.0 to 4.0 in the United States). However, the calculated eGPAs may be normalized to any desired numerical range.

The eGPA generation module 425 may additionally or alternatively normalize an eGPA of a user to a distribution of eGPAs of a set of users. In one embodiment, given a set of users $U=[u_1, u_2, \ldots u_N]$ having a respective eGPA g in the set $G=[g_{u1}, g_{u2}, \ldots g_{uN}]$, the eGPA generation module 425 normalizes the eGPA $g_{ui}$ for a user $u_i$ in U by the following equation:

$$\widehat{g_{u_i}} = \frac{g_{u_i} - \min(G)}{\max(G) - \min(G)} \quad (3)$$

in which $\widehat{g_{u_i}}$ represents the normalized eGPA for the user $u_i$. Alternatively, the eGPA generation module 425 may normalize the eGPA $g_{ui}$ for a user $u_i$ to a mean and standard deviation of the set G of eGPAs. The set of users U may be selected based on one or more common characteristics shared by the users, such as a school in which the users are enrolled, a location of the users, a major of the users, or an expected graduation year of the users.

The comparison module 430 applies a set of filters to the eGPAs generated by the eGPA generation module 425 to provide a mechanism for comparing users of the educational platform 205. The comparison module 430 filters the eGPAs based on characteristics of the associated users to identify a group of users sharing one or more common characteristics. The corresponding eGPAs of the users in the filtered group are then ranked to provide a relative ranking of the users in the group for comparing the users. In one embodiment, the comparison module 430 filters eGPAs based on user profile information of the users. Various examples of user profile filters include industry, school, major, expected graduation year, location, and profession of a user. For example, filtering the eGPA dataset by industry (e.g., as classified by the North American Industry Classification System) or profession provides a relative ranking of users within a selected industry or profession, or who are pursuing job offers within the selected industry or profession. Filtering the eGPA dataset by school provides a relative ranking of users who attend the same school or between users who attend schools offering similar types of education and courses. Filtering the eGPA dataset by major provides a relative ranking of users who are pursuing the same course of study, and filtering the eGPA dataset by expected graduation year provides a relative ranking of users who are at the same stage of their education.

In one embodiment, after the comparison module 430 has filtered the eGPAs, the eGPA generation module 425 normalizes the eGPAs in the filtered set to a distribution of the filtered eGPAs (for example, by equation 3). Accordingly, the eGPA generation module 425 effectively generates different eGPAs for a single user depending on whether the user is being compared to users attending a particular school, studying a particular major, or the like.

Additionally or alternatively, the weights assigned to each category of user activity data to generate a user's eGPA (e.g., by equation 1) may depend on the filters applied by the comparison module 430. For example, when comparing a student to other students at the same university, the student's academic GPA and engagement with the educational publishing platform 205 may be given a relatively large weight. On the other hand, when comparing a student at one university to students at other universities, the school ranking and course difficulty ranking categories may be more heavily weighted than the academic GPA and engagement categories.

Generating Effective Grade Point Averages

Figure 6:
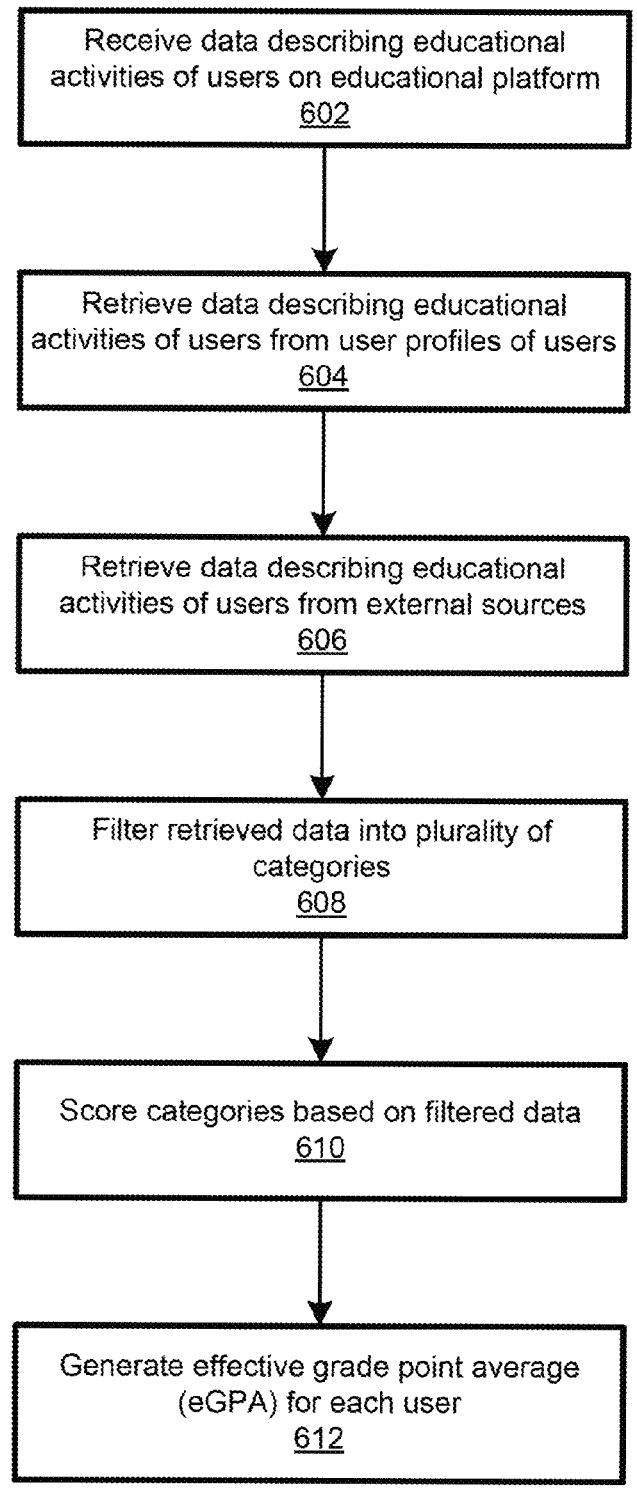
FIG. 6 is a flowchart illustrating a process for generating effective grade point averages for users of an educational publishing platform, according to one embodiment.

FIG. 6 is a flowchart illustrating a process for generating eGPAs for users of the publishing platform 205, according to one embodiment. In one embodiment, the steps of the process are performed by the publishing platform 205. Other embodiments perform the illustrated steps in different orders, and/or perform different or additional steps. Moreover, some of the steps may be performed by systems other than the publishing platform 205.

The publishing platform 205 receives 602 data describing educational activities of users on the platform 205. Users' activities on the platform 205 include interactions with pages of content distributed by the platform 205 as well as social interactions between users of the platform 205. The publishing platform 205 also retrieves 604 educational activity data from user profiles of the users, such as school, courses, and major of the user. Furthermore, the publishing platform 205 retrieves 606 data describing educational activities of users from external sources. In one embodiment, users of the publishing platform 205 select the external sources from which the platform 205 retrieves 606 the external data, thereby authorizing the platform 205 to access the data from the selected sources.

The publishing platform 205 filters 608 the educational activity data into categories of activities, and scores 610 the users' activities within each category based on the filtered activities and scoring metrics for the category. Using the scores assigned to each category of activities, the publishing platform 205 generates 612 an eGPA for each user of the platform 205. In one embodiment, the platform 205 generates 612 the eGPA by a weighted sum of the category scores. The eGPAs may be normalized to a range comparable to academic GPAs, such as a 0.0-4.0 scale, or may be normalized to a distribution of eGPAs of users within a specified set. As the scoring of the activities, the weights applied to the activities, and a distribution of eGPAs of users in a set of users may be different depending on user profile data of the user and filters applied to the users, multiple eGPAs may be generated for a single user.

The publishing platform 205 may periodically recalculate a user's eGPA. For example, the publishing platform 205 may recalculate a user's eGPA at a fixed time interval, such as once per week. As another example, the publishing platform 205 may recalculate the eGPA when a user completes a new educational activity or when new eGPA categories are added to the categories database 415. Accordingly, the eGPA may be a substantially real-time measure of a user's educational engagement. For example, a user who registers for a new class, begins an internship, or asks a question causes his eGPA to increase. A user who is not completing new educational activities may cause his eGPA to decrease, based on a time decay factor applied to the scored activities he has completed. Furthermore, a user's eGPA provides nearly real-time feedback to a user. In contrast to an academic GPA, which is typically calculated at the end of an educational cycle (that is, when it is too late to make adjustments to improve one's GPA), an eGPA may be calculated multiple times during an educational cycle. Thus, a user can determine early in an educational cycle whether he is achieving a desired eGPA, and complete educational activities to improve his eGPA if he is not.

Because an eGPA may represent not only a student's grades in the courses she has completed, but also her overall engagement in her courses, her extracurricular activities, her previous work experience, and other factors, an eGPA may provide a more descriptive comparison of users of the publishing platform 205 than an academic GPA alone. As one example application of eGPAs as described herein, students applying for a job or internship can use their eGPA to compare their qualifications for the desired position to the qualifications of other applicants. In one embodiment, when a user applies for a job via the publishing platform 205, the platform 205 displays eGPAs of users applying for the job to the user. By comparing her eGPA to that of the other users applying for the job, the user quickly gains an understanding of her overall qualifications in comparison to the qualifications of the other applicants. As another example, a user using the publishing platform 205 to apply for a scholarship can compare his eGPA to that of other applicants to determine his relative eligibility for the scholarship.

Moreover, because eGPAs can be flexibly calculated using variable weights applied to scored categories of user activity data, and can vary based on a set of applied filters, students can be easily compared based on any desired qualifications. For example, an employer seeking a job applicant having a specified major can filter the users to generate normalized eGPAs for students with the specified major. The eGPAs of the students in the filtered set allow the employer to easily compare the students having the specified major. As another example, an employer can specify weights for the categories of user activity data to indicate a relative importance of certain educational activities in preparing students for jobs offered by the employer. The eGPAs calculated using the specified weights then quantify students' preparedness for the employer's jobs.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for generating an effective grade point average for users of an online educational platform, the method comprising:

receiving data describing educational activities of each of a plurality of users on the online educational platform, the educational activities comprising passive, active, or recall interactions by the plurality of users with pages of content distributed by the online educational platform;

filtering the received data into a plurality of categories, each category associated with a weight and a scoring metric for scoring the data associated with the category;

scoring the filtered data by the online educational platform using the scoring metric associated with the categories;

generating, by the online educational platform, an effective grade point average for each user determined based on a sum of the scores assigned to the data weighted by the weights associated with the categories;

detecting a completion of a new educational activity by one of the plurality of users on the online educational platform, the new educational activity comprising a defined set of passive, active, or recall interactions by the user with pages of content distributed by the online educational platform; and responsive to detecting the completion of the new educational activity by the user:
  receiving data describing the passive, active, or recall interactions by the user with the pages of content;
  identifying a category of the plurality of categories associated with the new educational activity;
  scoring the new educational activity using the scoring metric associated with the identified category;
  recalculating the effective grade point average of the user based on a weighted sum of the generated effective grade point average and the score assigned to the new educational activity weighted based on the weight associated with the identified category; and
  reporting the recalculated effective grade point average to the user.

2. The method of claim 1, further comprising:
retrieving data describing educational activities of each of the plurality of users from a user profile of the respective user; and
scoring the data retrieved from the user profile;
wherein generating the effective grade point average for each user further comprises generating the effective grade point average based on the scores of the data retrieved from the user profile.

3. The method of claim 1, further comprising:
retrieving data describing educational activities of each of the plurality of users from external sources; and
scoring the data retrieved from the external sources;
wherein generating the effective grade point average for each user further comprises generating the effective grade point average based on the scores of the data retrieved from the external sources.

4. The method of claim 1, further comprising:
ranking a set of users applying for a same job through the online educational platform based on the effective grade point average of each of the users in the set; and
displaying the ranking to a user in the set of users.

5. The method of claim 1, further comprising:
ranking a set of users applying for a same scholarship through the online educational platform based on the effective grade point average of each of the users in the set; and
displaying the ranking to a user in the set of users.

6. The method of claim 1, wherein the educational activities comprise at least one of reading a document distributed by the online educational platform, creating user-generated content by the online educational platform, and taking a test distributed by the online educational platform.

7. The method of claim 1, further comprising:
filtering the effective grade point averages of the users based on user profile data of the users; and
ranking the users corresponding to the effective grade point averages in the filtered set based on the effective grade point averages.

8. The method of claim 7, wherein the user profile data comprises data selected from a group consisting of a school attended by a user, a major of a user, a graduation year of a user, and a location of a user.

9. The method of claim 1, wherein recalculating the effective grade point average comprises:
applying a time decay factor to the scored data based on an amount of time between completion of respective educational activities corresponding to the scored data and a completion of the new educational activity; and
generating the recalculated effective grade point average based on the time decayed data.

10. The method of claim 1, further comprising:
selecting the weight associated with each category based on user profile data of the user;
wherein the effective grade point average is recalculated by weighting the data describing the educational activities and the data describing the new educational activity by the selected weights.

11. A non-transitory computer-readable storage medium storing computer program instructions for generating an effective grade point average for users of an online educational platform, the computer program instructions comprising instructions for:
receiving data describing educational activities of each of a plurality of users on the online educational platform, the educational activities comprising passive, active, or recall interactions by the plurality of users with pages of content distributed by the online educational platform;
filtering the received data into a plurality of categories, each category associated with a weight and a scoring metric for scoring the data associated with the category;
scoring the filtered data by the online educational platform using the scoring metric associated with the categories;
generating, by the online educational platform, an effective grade point average for each user determined based on a sum of the scores assigned to the data weighted by the weights associated with the categories;
detecting a completion of a new educational activity by one of the plurality of users on the online educational platform, the new educational activity comprising a defined set of passive, active, or recall interactions by the user with pages of content distributed by the online educational platform; and
responsive to detecting the completion of the new educational activity by the user:
receiving data describing the passive, active, or recall interaction by the user with the pages of content;
identifying a category of the plurality of categories associated with the new educational activity;
scoring the new educational activity using the scoring metric associated with the identified category;
recalculating the effective grade point average of the user based on a weighted sum of the generated effective grade point average and the score assigned to the new educational activity weighted based on the weight associated with the identified category; and
reporting the recalculated effective grade point average to the user.

12. The non-transitory computer readable storage medium of claim 11, the computer program instructions further comprising instructions for:
retrieving data describing educational activities of each of the plurality of users from a user profile of the respective user; and
scoring the data retrieved from the user profile;
wherein generating the effective grade point average for each user further comprises generating the effective grade point average based on the scores of the data retrieved from the user profile.

13. The non-transitory computer readable storage medium of claim 11, the computer program instructions further comprising instructions for:
retrieving data describing educational activities of each of the plurality of users from external sources; and
scoring the data retrieved from the external sources;
wherein generating the effective grade point average for each user further comprises generating the effective grade point average based on the scores of the data retrieved from the external sources.

14. The non-transitory computer readable storage medium of claim 11, the computer program instructions further comprising instructions for:
ranking a set of users of the plurality of users based on the effective grade point average of each of the users in the set; and
displaying the ranking to a user in the set of users.

15. The non-transitory computer-readable storage medium of claim 14, wherein the set of users comprise users applying for a job through the online educational platform.

16. The non-transitory computer-readable storage medium of claim 14, wherein the set of users comprise users applying for a scholarship through the online educational platform.

17. The non-transitory computer-readable storage medium of claim 11, wherein the educational activities comprise at least one of reading a document distributed by the online educational platform, creating user-generated content by the online educational platform, and taking a test distributed by the online educational platform.

18. The non-transitory computer-readable storage medium of claim 11, wherein the effective grade point average for each user is generated further based on a relative ranking of the categories.

19. The non-transitory computer readable storage medium of claim 11, the computer program instructions further comprising instructions for:
filtering the effective grade point averages of the users based on user profile data of the users; and
ranking the users corresponding to the effective grade point averages in the filtered set based on the effective grade point averages.

20. The non-transitory computer-readable storage medium of claim 19, wherein the user profile data comprises data selected from a group consisting of a school attended by a user, a major of a user, a graduation year of a user, and a location of a user.

* * * * *